(12) United States Patent
de Ruijter

(10) Patent No.: US 10,787,045 B2
(45) Date of Patent: Sep. 29, 2020

(54) METHOD, DEVICE, COMPUTER PROGRAM, AND COMPUTER PROGRAM PRODUCT FOR MAKING AVAILABLE DATA

(71) Applicant: Bayerische Motoren Werke Aktiengesellschaft, Munich (DE)

(72) Inventor: Markus de Ruijter, Bruckmuehl (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/268,697

(22) Filed: Sep. 19, 2016

(65) Prior Publication Data

US 2017/0001482 A1 Jan. 5, 2017

Related U.S. Application Data

(63) Continuation of application No. PCT/EP2015/054484, filed on Mar. 4, 2015.

(30) Foreign Application Priority Data

Mar. 20, 2014 (DE) .................. 10 2014 205 168

(51) Int. Cl.
*B60C 23/04* (2006.01)
*B60C 11/24* (2006.01)
(Continued)

(52) U.S. Cl.
CPC ........ *B60C 23/0408* (2013.01); *B60C 11/246* (2013.01); *G07C 5/085* (2013.01); *B60C 23/0433* (2013.01); *B60C 2019/004* (2013.01)

(58) Field of Classification Search
None
See application file for complete search history.

(56) References Cited

U.S. PATENT DOCUMENTS 3,554,027 A * 1/1971 Sperberg ............ B29D 30/0633
73/146
3,563,088 A * 2/1971 Sperberg ............ B29D 30/0633
73/146
(Continued)

FOREIGN PATENT DOCUMENTS

CN 1141613 A 1/1997
DE 100 58 099 A1 5/2002
(Continued)

OTHER PUBLICATIONS

International Search Report (PCT/ISA/210) issued in PCT Application No. PCT/EP2015/054484 dated Apr. 17, 2015 with English translation (Four (4) pages).

(Continued)

*Primary Examiner* — Shelley Chen
(74) *Attorney, Agent, or Firm* — Crowell & Moring LLP

(57) ABSTRACT

In a method for making available data relating to the tires of a vehicle, vehicle data and/or tire data is made available by a vehicle memory unit of the vehicle, wherein the vehicle data is acquired by a sensor which is arranged in the vehicle. The vehicle data and/or the tire data have information on at least one property of the tires of the vehicle. A tire-wear probability of the tires of the vehicle is acquired as a function of the vehicle data and/or tire data. The tire-wear probability and/or the vehicle data and/or tire data are stored permanently in a memory unit arranged externally with respect to the vehicle and are made available for determining whether the vehicle requires new tires.

19 Claims, 1 Drawing Sheet

(51) Int. Cl.
*G07C 5/08* (2006.01)
*B60C 19/00* (2006.01)

(56) References Cited

U.S. PATENT DOCUMENTS

| | | | | |
|---|---|---|---|---|
| 4,028,937 | A * | 6/1977 | Crano | G01M 17/02 73/146 |
| 4,269,252 | A * | 5/1981 | Shapiro | B60C 23/12 152/426 |
| 6,087,930 | A * | 7/2000 | Kulka | B60C 23/0493 340/447 |
| 6,826,951 | B1 | 12/2004 | Schuessler, Jr. et al. | |
| 2004/0073339 | A1* | 4/2004 | Ruoppolo | B60C 23/0408 701/1 |
| 2009/0205405 | A1 | 8/2009 | Bauchot et al. | |
| 2010/0238007 | A1 | 9/2010 | Kikuchi et al. | |
| 2010/0271191 | A1 | 10/2010 | De Graff et al. | |
| 2010/0274441 | A1 | 10/2010 | Carresjo | |
| 2014/0067193 | A1* | 3/2014 | Gokyu | B60C 99/006 701/31.9 |

FOREIGN PATENT DOCUMENTS

| | | | | |
|---|---|---|---|---|
| EP | 2 703 194 | A1 | 3/2014 | |
| EP | 2703194 | A1 * | 3/2014 | B60C 23/0408 |

OTHER PUBLICATIONS

German-language Written Opinion (PCT/ISA/237) issued in PCT Application No. PCT/EP2015/054484 dated Apr. 17, 2015 (Five (5) pages).
German-language Search Report issued in counterpart German Application No. 10 2014 205 168.1 dated Jan. 30, 2015 with partial English translation (Nine (9) pages).
Chinese-language Office Action issued in counterpart Chinese Application No. 201580015170.X dated Nov. 16, 2017 with English translation (twenty-two (22) pages).

* cited by examiner

METHOD, DEVICE, COMPUTER PROGRAM, AND COMPUTER PROGRAM PRODUCT FOR MAKING AVAILABLE DATA

CROSS REFERENCE TO RELATED APPLICATIONS

This application is a continuation of PCT International Application No. PCT/EP2015/054484, filed Mar. 4, 2015, which claims priority under 35 U.S.C. § 119 from German Patent Application No. 10 2014 205 168.1, filed Mar. 20, 2014, the entire disclosures of which are herein expressly incorporated by reference.

BACKGROUND AND SUMMARY OF THE INVENTION

The invention relates to a method for providing data relating to tires of a vehicle. The invention further relates to an apparatus for providing data relating to tires of a vehicle. The invention moreover relates to a computer program and a computer program product for providing data relating to tires of a vehicle.

In vehicles today, frequently neither a vehicle owner nor an authorized dealer, for example, has any overview of the extent to which the tires of the vehicle are worn and what tires are currently installed on the vehicle.

The object on which the invention is based is that of providing data outside a vehicle that are able to be used to reliably infer a condition of the tires of the vehicle.

This and other objects are achieved, according to a first aspect of the invention, by a method for providing data relating to tires of a vehicle, as well as by an apparatus that corresponds to the method for providing data relating to tires of a vehicle.

Tire data are provided by a vehicle memory unit of the vehicle. The tire data have a piece of information pertaining to at least one property of the tires of the vehicle. The tire data are taken as a basis for determining a tire wear probability for the tires of the vehicle. The tire wear probability and the tire data are permanently stored in a memory unit arranged externally to the vehicle and are provided for determining whether the vehicle needs new tires and/or what new tires the vehicle needs.

By way of example, the tire data comprise a brand of the tire, a dimension and/or a tire type, such as whether it is a summer, winter or all-year tire, for example. The tire data alternatively or additionally comprise whether the tire is what is known as a "run-flat" tire, for example. The tire data alternatively or additionally comprise a date of manufacture, a date on which the respective tire has been fitted to the vehicle, the name of the manufacturer and/or the 12-digit tire identification number (TIN), for example.

This provides a simple way of storing data outside the vehicle that are able to be used to determine whether the vehicle needs new tires. By way of example, it is thus possible for a vehicle dealer to use the tire data and/or the tire wear probability to determine in a simple manner whether the vehicle needs new tires. In addition, this provides a simple way of using the tire data to determine what tires are needed.

According to one advantageous refinement, the tire wear probability is determined externally to the vehicle.

This allows the tire wear probability to be determined centrally, for example, so that only the data that are needed for determining the tire wear probability have to be transmitted on the vehicle. This can result in a cost saving, for example, since the tire wear probability for multiple vehicles can therefore be determined centrally.

According to a further advantageous refinement, the tire wear probability is determined on the vehicle.

Since the vehicle possibly always contains the current tire data, this allows the tire wear probability to be determined particularly reliably.

According to a further advantageous refinement, the tire data and/or the tire wear probability are transmitted from a vehicle transmission unit to a reception unit arranged externally to the vehicle via a wireless radio link, in order to store the tire wear probability and the tire data in the memory unit arranged externally to the vehicle.

This allows the tire data and/or the tire wear probability to be transmitted very simply and reliably, for example by use of a radio transmission unit that is already installed in the vehicle for other purposes. By way of example, the data are transmitted by a mobile radio. The tire data and/or the tire wear probability are sent to the reception unit not directly, for example, but rather indirectly via one or more radio antennas, for example, and/or via one or more switching units.

According to a further advantageous refinement, the tire data are transmitted to a vehicle reception unit when triggered by the tires being fitted to the vehicle, in order to store the tire data in the vehicle memory unit.

This can contribute to current tire data possibly preferably always being stored in the vehicle memory unit. In this context, current means that the tire data match the tires that are fitted to the vehicle. This allows the tire wear probability to be determined very reliably.

According to a further advantageous refinement, the tire data and/or the tire wear probability are taken as a basis for automatically determining, externally to the vehicle, whether the vehicle needs new tires.

The automatic determination means that the information regarding whether the vehicle probably needs new tires is available externally to the vehicle. This information may distinctly be needed externally to the vehicle, for example by a vehicle dealer.

According to further advantageous refinement, if it has been determined that the vehicle needs new tires, then a signal indicating that the vehicle needs new tires is given.

The signaling can be provided for a dealer, for example, so that said dealer can subsequently provide a vehicle owner, for example, with a quote for new tires that match the tire data. Alternatively or additionally, it is also possible to signal to the vehicle driver, for example, that he needs new tires.

According to a second aspect, which can be used independently of or in combination with the first aspect and the embodiments thereof, the invention is distinguished by a method for providing data relating to tires of a vehicle. The invention is moreover distinguished by an apparatus that corresponds to the method for providing data relating to tires of a vehicle according to the second aspect. Vehicle data from the vehicle are provided that have been determined by way of at least one sensor that is arranged in the vehicle. The vehicle data are taken as a basis for determining a tire wear probability for the tires of the vehicle. The tire wear probability is permanently stored in a memory unit arranged externally to the vehicle and is provided for determining whether the vehicle needs new tires.

Distinctly, the vehicle data can be used to determine the tire wear probability very reliably if need be, which means that there is a very high probability of being able to reliably determine whether the vehicle needs new tires.

By way of example, the vehicle data comprise a mileage of at least one of the individual tires, torque profiles of the vehicle, weight profiles of the vehicle and/or further key indicators for driving dynamics.

According to a further advantageous refinement, the vehicle data comprise a respective unique identifier for a respective tire pressure sensor of the tires of the vehicle. The respective unique identifier is taken as a basis for determining the tire wear probability.

In modern vehicles, there is a tire pressure sensor, which has a unique identifier, installed particularly on every rim and/or in every tire. If the vehicle owner now changes the tires himself, for example, this can be detected, since subsequently, by way of example, an already known unique identifier for a tire pressure sensor is detected at a different location on the vehicle and/or a new unique identifier for a tire pressure sensor is detected on the vehicle. By taking this into consideration, it is possible to reliably determine whether the original tires are still fitted or whether they are possibly fitted at a different location or possibly new tires have been fitted. Hence, by taking into consideration the unique identifier of the respective tire pressure sensor, it is possible to determine the tire wear probability very reliably.

According to a further advantageous refinement, tire data are provided by a vehicle memory unit of the vehicle, which tire data have a piece of information pertaining to at least one property of the tire of the vehicle. The tire data and/or vehicle data are taken as a basis for determining the tire wear probability of the tires of the vehicle. The tire wear probability and the tire data are permanently stored in the memory unit arranged externally to the vehicle and are provided for determining whether the vehicle needs new tires. If it has been determined that the vehicle needs new tires, for example, this allows the tire data to be used to determine what tires are needed, since the tire data comprise a brand of the tire and/or a dimension and/or a tire type of the fitted tires, for example.

According to a further advantageous refinement, the tire data are transmitted to a vehicle reception unit when triggered by the tires being fitted to the vehicle, in order to store the tire data in the vehicle memory unit.

This can contribute to current tire data possibly preferably always being stored in the vehicle memory unit. In this context, current means that the tire data match the tires that are fitted to the vehicle. This allows the tire wear probability to be determined very reliably.

According to a further advantageous refinement, the tire data, the vehicle data and/or the tire wear probability are transmitted from a vehicle transmission unit to a reception unit arranged externally to the vehicle via a wireless radio link, in order to store the tire wear probability and the tire data in the memory unit arranged externally to the vehicle.

This allows the tire data, the vehicle data and/or the tire wear probability to be transmitted very simply and reliably, for example by means a radio transmission unit that is already installed in the vehicle for other purposes. By way of example, the data are transmitted by use of mobile radio. The tire data and/or the vehicle data and/or the tire wear probability are sent to the reception unit not directly, for example, but rather indirectly via one or more radio antennas, for example, and/or via one or more switching units.

According to a further advantageous refinement, the tire wear probability is determined externally to the vehicle.

This allows the tire wear probability to be determined centrally, for example, so that only the data that are needed for determining the tire wear probability have to be transmitted on the vehicle. This can result in a cost saving, for example, since the tire wear probability for multiple vehicles can therefore be determined centrally.

According to a further advantageous refinement, the tire wear probability is determined on the vehicle.

Since the vehicle possibly always contains the current tire data, this allows the tire wear probability to be determined particularly reliably.

According to a further advantageous refinement, the tire data and/or the tire wear probability are taken as a basis for automatically determining, externally to the vehicle, whether the vehicle needs new tires.

The automatic determination means that the information regarding whether the vehicle probably needs new tires is available externally to the vehicle. This information may distinctly be needed externally to the vehicle, for example by a vehicle dealer.

According to a further advantageous refinement, if it has been determined that the vehicle needs new tires, then a signal indicating that the vehicle needs new tires is given.

The signaling can be provided for a dealer, for example, so that said dealer can subsequently provide a vehicle owner, for example, with a quote for new tires that match the tire data. Alternatively or additionally, it is also possible to signal to the vehicle driver, for example, that he needs new tires.

According to a further aspect, the invention is distinguished by a computer program, wherein the computer program is designed to perform the method for providing data relating to tires of a vehicle according to the first aspect or an advantageous refinement of the method for providing data relating to tires of a vehicle according to the first aspect or the method for providing data relating to tires of a vehicle according to the second aspect or an advantageous refinement of the method for providing data relating to tires of a vehicle according to the second aspect on a data processing apparatus.

According to a further aspect, the invention is distinguished by a computer program product that comprises executable program code, wherein the program code performs the method for providing data relating to tires of a vehicle according to the first aspect or an advantageous refinement of the method for providing data relating to tires of a vehicle according to the first aspect or the method for providing data relating to tires of a vehicle according to the second aspect or an advantageous refinement of the method for providing data relating to tires of a vehicle according to the second aspect when executed by a data processing apparatus.

The computer program product particularly comprises a medium that is readable by the data processing apparatus and on which the program code is stored.

Other objects, advantages and novel features of the present invention will become apparent from the following detailed description of one or more preferred embodiments when considered in conjunction with the accompanying drawings.

BRIEF DESCRIPTION OF THE DRAWINGS

Elements having the same design or function are denoted by the same reference symbols throughout the figures.

DETAILED DESCRIPTION OF THE DRAWINGS

Figure 1:
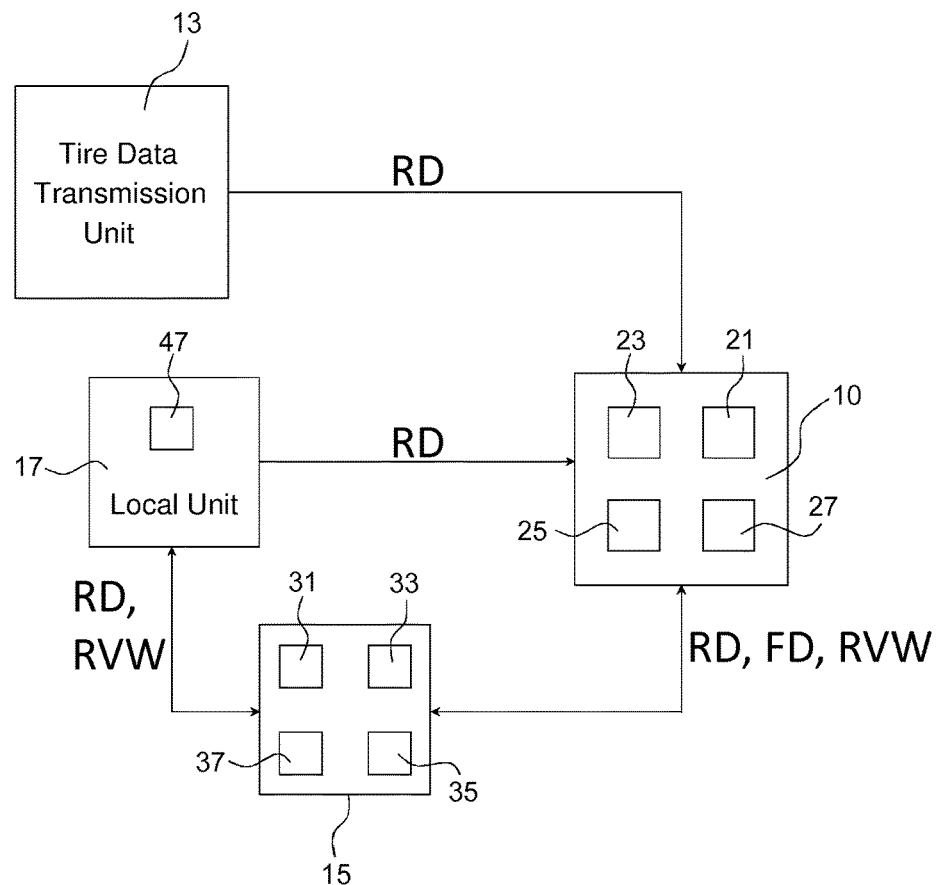
FIG. 1 is a schematic block diagram of a system for providing data relating to tires of a vehicle according to an embodiment of the invention.

FIG. 1 shows a system for providing data relating to tires of a vehicle 10.

The vehicle 10 has a vehicle memory unit 21 that is designed to permanently store data, such as tire data RD, for example, that have a piece of information pertaining to at least one property of the tires of the vehicle 10.

To this end, by way of example, a tire data transmission unit 13 arranged externally to the vehicle 10 is designed to transmit the tire data RD to a vehicle reception unit 23. The vehicle reception unit 23 is coupled to the vehicle memory unit 21 for communication purposes.

By way of example, the tire data transmission unit 13 is produced in a factory in which the vehicle 10 is manufactured. By way of example, the tire data transmission unit 13 is designed to transmit the tire data RD after tires have been fitted to the vehicle 10.

In this context, the tire data RD are transmitted from a database, for example. The database comprises documentation pertaining to fitted components, for example. The database stores production and property data, for example, for each individual vehicle produced, such as date of production, parts list, factory, software levels installed and/or the tire data RD, for example.

Alternatively, or additionally, the tire data transmission unit 13 is produced in an inspection unit and designed to transmit the tire data RD during an inspection prior to delivery of the vehicle 10 to a customer.

In addition, the tire data RD can also be prescribed by a customer, for example in the vehicle 10.

By way of example, the tire data RD comprise a unique tire identification, such as the brand of the tire, the factory, the dimension, the model and/or the date of production of the tire, for example in the form of what is known as the DOT (Department of Transportation) number. Alternatively, or additionally, the tire data RD can comprise a type of the tire, for example, such as whether it is a summer and/or winter tire and/or an all-year tire, for example. Alternatively or additionally, the tire data RD comprise a respective special feature of the tires, such as whether it is a run-flat tire, for example. Alternatively or additionally, the tire data RD comprise when the tires where fitted.

By way of example, the tire data RD can alternatively or additionally be transmitted to the vehicle 10 by a local unit 17, for example by a vehicle dealer after new tires are fitted.

By way of example, the tire data RD can alternatively or additionally be transmitted to the vehicle 10 by a backend server 15, for example by way of a wireless radio link. To this end, after new tires are installed, for example, the local unit 17 can transmit the tire data RD to the backend server 15 and from the latter on to the vehicle 10.

In this context, the backend server 15 is distinguished particularly by virtue of its being designed to send, to receive and to permanently store data, particularly data that relate to a vehicle.

To this end, the backend server 15 comprises an external reception unit 33 for receiving data from the local unit 17 and/or from the vehicle 10, an external memory unit 31 for storing data and an external transmission unit 35 for sending data to the local unit 17 and/or to the vehicle 10, for example.

The data transmission between the vehicle 10 and the backend server 15 is implemented particularly by way of a wireless radio link, for example by way of mobile radio, the data transmission being implemented indirectly, for example, via one or more radio antennas and/or via one or more switching units, for example.

The vehicle 10 additionally comprises a vehicle transmission unit 25 that is designed to transmit the tire data RD, vehicle data FD and/or a tire wear probability RVW, to the backend server 15 arranged externally to the vehicle 10. The tire data RD, the vehicle data FD and/or the tire wear probability RVW are particularly each transmitted with a time stamp, and/or with key data for unequivocal association with the vehicle 10.

The vehicle data FD are determined particularly by use of at least one sensor that is arranged in the vehicle 10. By way of example, the vehicle data FD comprise a mileage of the individual tires, torque profiles of the vehicle 10, weight profiles of the vehicle 10 and/or further key indicators for driving dynamics. Alternatively or additionally, the vehicle data FD comprise a respective unique identifier for a respective tire pressure sensor of the tires of the vehicle 10.

The tire wear probability RVW particularly comprises a piece of information about how probably the tires of the vehicle 10 are worn. The tire wear probability RVW is determined particularly on the basis of the vehicle data FD and/or the tire data RD.

The backend server 15 has a backend control apparatus 37, the vehicle 10 has a vehicle control apparatus 27 and the local unit 17 has a local control apparatus 47. The backend control apparatus 37, the vehicle control apparatus 27 and the local control apparatus 47 each have a computation unit, a data and program memory and at least one communication interface. The respective computation units, data and program memories and communication interfaces are able to be produced in one unit and/or in a manner distributed over multiple units.

The backend control apparatus 37 and/or the vehicle control apparatus 27 and/or a configuration distributed over the backend control apparatus 37 and/or the vehicle control apparatus 27 and/or the local control apparatus 47 store(s) particularly a program that is explained in more detail below with reference to the flowchart in FIG. 2.

Figure 2:
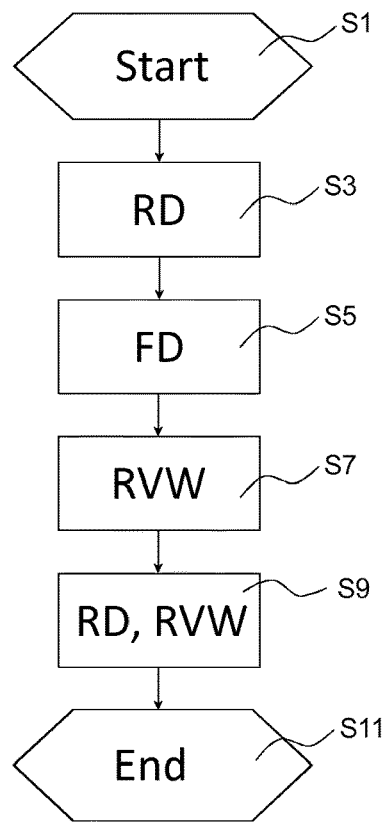
FIG. 2 is an exemplary flowchart for a program for providing data relating to tires of a vehicle.

Referring to FIG. 2, in a step S1 the program is started. In step S1, variables are initialized as appropriate.

In a step S3, the tire data RD are provided by the vehicle memory unit 21 of the vehicle 10.

In a step S5, as an alternative or in addition to step S3, the vehicle data FD of the vehicle 10 are provided.

In a step S7, the tire wear probability RVW is determined on the basis of the tire data RD and/or the vehicle data FD. The tire wear probability RVW is determined by the backend control apparatus 37 and/or by the vehicle control apparatus 27, for example.

In a step S9, the tire data RD and/or the tire wear probability RVW are permanently stored in the external memory unit 31. When the tire wear probability RVW is determined in the vehicle control apparatus 27, this involves the tire data RD and/or the vehicle data FD being transmitted to the backend server 15, particularly by way of mobile radio. Subsequently, the program is terminated in a step S11.

Alternatively the program can be continued after step S9, and a further step involves determining, externally to the vehicle 10, whether the vehicle 10 needs new tires. This is determined particularly in the backend control apparatus 37 and/or the local control apparatus 47.

Subsequently, if it has been determined that the vehicle 10 needs new tires, it is possible, for example additionally, for a further step to involve giving a signal that the vehicle 10 needs new tires. This is performed particularly in the local control apparatus 47, if the visualization is provided for a dealer, for example, and/or in the vehicle control apparatus 27, if the visualization is provided for a driver of the vehicle 10.

The approach shown means that the tire data RD and/or the tire wear probability RVW are stored in the external memory unit 31 and, when they are needed, can be requested by the local control apparatus 47, for example, so that a dealer, for example, can determine whether the vehicle 10 needs new tires and/or what new tires the vehicle needs.

In summary, the following can be stated. The invention involves a method, an apparatus, a computer program and a computer program product being specified, to provide data relating to tires of a vehicle. In this case, particularly vehicle and/or tire data are provided by a vehicle memory unit of the vehicle, the vehicle data being determined by a sensor that is arranged in the vehicle. The vehicle data and/or the tire data have a piece of information pertaining to at least one property of the tires of the vehicle. The vehicle and/or tire data are taken as a basis for determining a tire wear probability for the tires of the vehicle. The tire wear probability, the vehicle and/or tire data are permanently stored in a memory unit arranged externally to the vehicle and are provided for determining whether the vehicle needs new tires.

LIST OF REFERENCE SYMBOLS

10 Vehicle
13 Tire data transmission unit
15 Backend server
17 Local unit
21 Vehicle memory unit
23 Vehicle reception unit
25 Vehicle transmission unit
27 Vehicle control apparatus
31 External memory unit
33 External reception unit
35 External transmission unit
35 Backend control apparatus
37 Local control apparatus
47 FD Vehicle data
RD Tire data
RVW Tire wear probability The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing data relating to tires of a vehicle, the method comprising the acts of:
    providing tire data from a vehicle memory unit of the vehicle, which tire data have a piece of information pertaining to at least one property of the tires of the vehicle;
    determining a tire wear probability for the tires of the vehicle based on the provided tire data; and
    permanently storing the tire wear probability and the tire data in a memory unit arranged externally to the vehicle, wherein the tire wear probability and the tire data are provided for determining whether the vehicle needs new tires, wherein
    the tire data comprise a brand of the tire, a dimension of the tire, a tire type, a date of manufacture of the tire, a date on which the tire has been fitted to the vehicle, a name of the tire manufacturer, and/or a 12-digit tire identification number.

2. The method according to claim 1, wherein the tire wear probability is determined externally to the vehicle.

3. The method according to claim 1, wherein the tire wear probability is determined on the vehicle.

4. The method according to claim 1, wherein
    the tire data and/or the tire wear probability are transmitted from a vehicle transmission unit to a reception unit arranged externally to the vehicle via a wireless radio link in order to store the tire wear probability and/or the tire data in the memory unit arranged externally to the vehicle.

5. The method according to claim 1, wherein the tire data are transmitted to a vehicle reception unit when triggered by the tires being installed on the vehicle in order to store the tire data in the vehicle memory unit.

6. A method for providing data relating to tires of a vehicle, the method comprising the acts of:
    providing vehicle data from the vehicle, said vehicle data being determined via at least one sensor arranged in the vehicle;
    providing tire data from a vehicle memory of the vehicle, which tire data have a piece of information pertaining to at least one property of the tires of the vehicle;
    determining a tire wear probability for the tires of the vehicle based on the provided vehicle data; and
    permanently storing the tire wear probability in a memory unit arranged externally to the vehicle, wherein the tire wear probability is provided for determining whether the vehicle needs new tires, and
    the vehicle data comprise a respective unique identifier for a respective tire pressure sensor of the tires of the vehicle, said respective unique identifier being taken as a basis for determining the tire wear probability.

7. The method according to claim 6, wherein the vehicle data comprise one or more of:
    data pertaining to a mileage of at least one individual tire on the vehicle,
    data pertaining to torque profiles of the vehicle,
    data pertaining to weight profiles of the vehicle, or
    data pertaining to other driving dynamic indicators of the vehicle.

8. The method according to claim 6, further comprising the acts of:
    determining the tire wear probability of the tires of the vehicle based on the provided tire data and the vehicle data; and
    storing the tire wear probability and tire data in the memory unit arranged external to the vehicle, wherein the tire wear probability and the tire data are provided for determining whether the vehicle needs new tires.

9. The method according to claim 8, wherein
    the tire data, the vehicle data, and/or the tire wear probability are transmitted from a vehicle transmission unit to a reception unit arranged externally to the vehicle via a wireless radio link in order to store the tire wear probability and the tire data in the memory unit arranged externally to the vehicle.

10. The method according to claim 8, wherein the tire data are transmitted to a vehicle reception unit when trigged by the tires being installed on the vehicle in order to store the tire data in the vehicle memory unit.

11. The method according to claim 8, wherein the tire data and/or the tire wear probability are taken as a basis for automatically determining, externally to the vehicle, whether the vehicle needs new tires.

12. The method according to claim 11, wherein if it is determined that the vehicle needs new tires, a signal indicating that the vehicle needs new tires is output.

13. The method according to claim 6, wherein the tire wear probability is determined externally to the vehicle.

14. The method according to claim 6, wherein the tire wear probability is determined on the vehicle.

15. An apparatus for providing data relating to tires of a vehicle, comprising:
a data processing apparatus and associated memory having stored therein program code that is executed to:
provide tire data from a vehicle memory unit of the vehicle, which tire data have a piece of information pertaining to at least one property of the tires of the vehicle;
determine a tire wear probability for the tires of the vehicle based on the provided tire data;
permanently store the tire wear probability and the tire data in a memory unit stored externally to the vehicle, the tire wear probability and the tire data being provided for determining whether the vehicle needs new tires, wherein
the tire data comprise a brand of the tire, a dimension of the tire, a tire type, a date of manufacture of the tire, a date on which the tire has been fitted to the vehicle, a name of the tire manufacturer, and/or a 12-digit tire identification number.

16. A computer program product comprising one or more non-transitory computer readable mediums having stored thereon program code that, when executed, causes a data processing apparatus to:
provide tire data from a vehicle memory unit of the vehicle, which tire data have a piece of information pertaining to at least one property of the tires of the vehicle;
determine a tire wear probability for the tires of the vehicle based on the provided tire data;
permanently store the tire wear probability and the tire data in a memory unit stored externally to the vehicle, the tire wear probability and the tire data being provided for determining whether the vehicle needs new tires, wherein
the tire data comprise a brand of the tire, a dimension of the tire, a tire type, a date of manufacture of the tire, a date on which the tire has been fitted to the vehicle, a name of the tire manufacturer, and/or a 12-digit tire identification number.

17. The method according to claim 4, wherein the vehicle transmission unit is manufactured in a factory in which the vehicle is manufactured, and the vehicle transmission unit is configured to transmit the tire data after the tires have been fitted to the vehicle.

18. The method according to claim 9, wherein the vehicle transmission unit is manufactured in a factory in which the vehicle is manufactured, and the vehicle transmission unit is configured to transmit the tire data after the tires have been fitted to the vehicle.

19. The method according to claim 1, wherein the tire wear probability is determined on the basis of the tire data and vehicle data.

* * * * *